US008286985B2

(12) United States Patent
Frocklage

(10) Patent No.: US 8,286,985 B2
(45) Date of Patent: Oct. 16, 2012

(54) DOUBLE HINGED TOW HITCH

(76) Inventor: David Frocklage, Dease Lake (CA)

( * ) Notice: Subject to any disclaimer, the term of this patent is extended or adjusted under 35 U.S.C. 154(b) by 91 days.

(21) Appl. No.: 13/010,868

(22) Filed: Jan. 21, 2011

(65) Prior Publication Data

US 2011/0181021 A1 Jul. 28, 2011

Related U.S. Application Data

(60) Provisional application No. 61/297,792, filed on Jan. 24, 2010.

(51) Int. Cl.
*B60D 1/14* (2006.01)

(52) U.S. Cl. .................. 280/459; 280/460.1; 280/461.1; 280/458; 280/457; 280/456.1; 280/293; 280/294; 280/292; 280/491.1; 280/491.3; 280/491.4; 280/498

(58) Field of Classification Search .................. 280/459, 280/460.1, 461.1, 458, 457, 456.1, 293, 294, 280/292, 491.1, 491.3, 491.4, 498
See application file for complete search history.

(56) References Cited

U.S. PATENT DOCUMENTS 3,917,315 A * 11/1975 Ostebee et al. ............... 280/457
4,312,516 A 1/1982 Olsen
5,711,542 A * 1/1998 Kendall ..................... 280/491.4
5,775,714 A * 7/1998 Meadows ...................... 280/458
5,823,560 A 10/1998 Van Vleet
5,851,021 A 12/1998 Van Kley
6,485,046 B1 11/2002 Hsueh et al.
6,536,793 B2 3/2003 Sargent
6,679,512 B1 * 1/2004 Plessala ........................ 280/504
6,764,092 B1 * 7/2004 Greaves, Jr. .................. 280/494
7,013,822 B2 * 3/2006 Gencarelli .................... 114/249

* cited by examiner

*Primary Examiner* — Lesley D Morris
*Assistant Examiner* — Marlon Arce
(74) *Attorney, Agent, or Firm* — Buckingham, Doolittle & Burroughs, LLP

(57) ABSTRACT

An architecture is presented that provides a double hinged tow hitch. The tow hitch is attached to a tow vehicle and allows full traction to the ground and complete control of steering. The tow hitch comprises two hinges secured together by a pin positioned at an upper portion of the hinges and a pin positioned at a lower portion of the hinges. The pins secure the hinges together and allow the hinges to flex in two positions. Additionally, the tow hitch comprises springs positioned on either side of the hinges and rubber positioned between the hinges to act as a shock absorber. When pressure is applied to the tow hitch, the springs will collapse into either the upper or lower portions of the hinges, causing the hinges to flex in two positions and pressing against the rubber between the hinges, thus acting as a suspension system for the tow hitch.

20 Claims, 3 Drawing Sheets

104 112 110 112 110 100 102 108 108 102 106

302 100 300 108 104 102 108 304 102 300 106

DOUBLE HINGED TOW HITCH

CROSS-REFERENCE

This application claims priority from Provisional Patent Application Ser. No. 61/297,792 filed Jan. 24, 2010.

BACKGROUND

When towing a trailer, it is important for the driver to have complete control over both the tow vehicle and the trailer. However, when traveling over rough terrain, the conventional stiff hitch will lift the rear wheels of the trailer off the ground. This can result in a loss of traction. Furthermore, sometimes the complete opposite effect occurs and the trailer's front wheels are lifted off of the ground. This can result in a loss of steering. The vehicle and the trailer both incur damage during this process. Additionally, it can be costly to maintain the equipment and the trailer often needs to be replaced sooner than expected.

Consequently, a need exists for a tow hitch that is designed to increase the safety of a tow vehicle and trailer, while providing a smooth and comfortable ride. The proposed tow hitch allows for full traction and complete control of steering and eliminates virtually all road bounce by acting as a separate suspension system. The tow hitch also saves consumers money by eliminating repair costs caused by broken hitches, bent bumpers, cracked frames, and the like. The tow hitch allows for easy disengagement from a quad or tow vehicle while stuck in the mud or snow. It can also be used in conjunction with all types of trailers, including vehicle and quad trailers.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a double hinged tow hitch. The double hinged tow hitch device comprises at least one hinge, preferably the tow hitch device comprises two hinges. The two hinges of the tow hitch device are secured together by a pin positioned at an upper portion of the hinges and a pin positioned at a lower portion of the hinges. The pins secure the hinges together and allow the hinges to flex in two positions.

Additionally, the tow hitch device comprises at least one spring positioned on either side of the hinges, preferably the tow hitch device comprises two springs. Rubber is then positioned between the hinges to act as a shock absorber. When pressure is applied to the tow hitch, the springs will collapse into either the upper or lower portions of the hinges, causing the hinges to flex in two positions and pressing against the rubber between the hinges, thus acting as a suspension system for the tow hitch. The springs can be adjusted and additional springs can be added to accommodate different loads.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
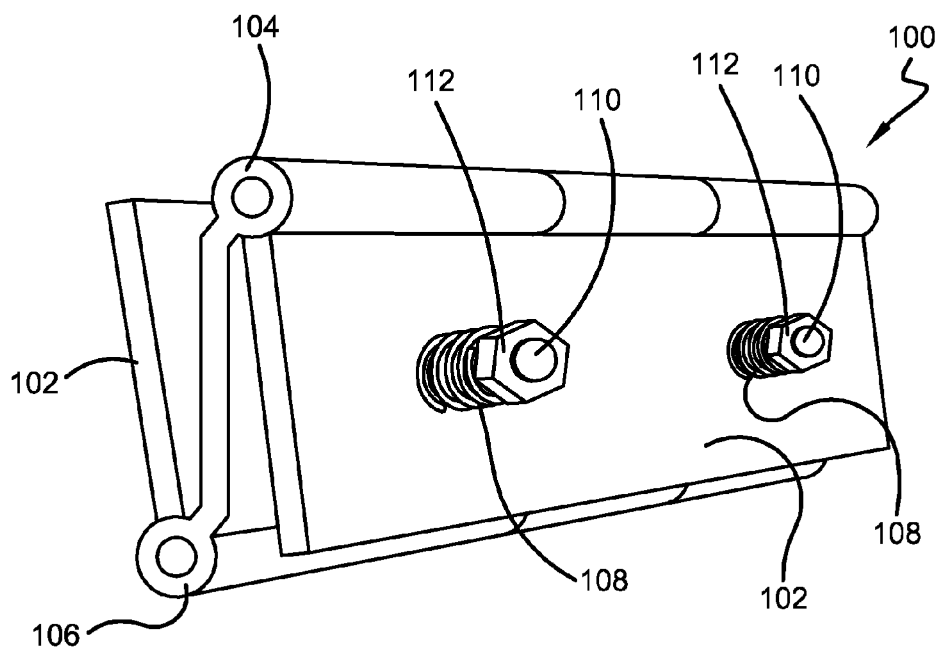
FIG. 1 illustrates a perspective view of a double hinged tow hitch device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

When traveling over rough terrain, the conventional stiff hitch will lift the rear wheels of the trailer off the ground. This can result in a loss of traction. Furthermore, sometimes the complete opposite effect occurs and the trailer's front wheels are lifted off of the ground. This can result in a loss of steering. The vehicle and the trailer both incur damage during this process. Additionally, it can be costly to maintain the equipment and the trailer often needs to be replaced sooner than expected. A tow hitch that is designed to increase the safety of a tow vehicle and trailer, while providing a smooth and comfortable ride would allow a driver to have complete control over both the tow vehicle and the trailer.

Accordingly, the disclosed tow hitch provides users an independent suspension system, which will allow for a smooth ride and minimal wear and tear on a tow vehicle and trailer. By acting as a separate suspension system, the tow hitch allows for full traction and complete control of steering and eliminates virtually all road bounce. The tow hitch also allows for easy disengagement from a quad or tow vehicle while stuck in the mud or snow and can be used in conjunction with all types of trailers, including vehicle and quad trailers.

Referring initially to the drawings, FIG. 1 illustrates a double hinged tow hitch device 100. The double hinged tow hitch device 100 comprises at least one hinge 102, preferably the double hinged tow hitch device 100 comprises two hinges 102. However, the double hinged tow hitch device 100 could comprise any number of hinges 102 without affecting the overall concept of the invention. Further, the tow hitch device 100 comprises a pin 104 secured at an upper portion of the hinges 102 and a pin 106 secured at a lower portion of the hinges 102. The pins 104 and 106 act to secure the hinges 102 together and allow the hinges 102 to flex in two positions.

Additionally, the tow hitch device 100 comprises at least one spring 108 positioned on either side of the hinge 102, preferably the tow hitch device 100 comprises four springs 108. However, the tow hitch device 100 could comprise any number of springs 108 without affecting the overall concept of the invention. Typically, the springs 108 are heavy springs that act as a suspension system for the tow hitch 100. When pressure is applied to the tow hitch 100, the springs 108 will collapse into either the upper or lower portions of the hinges 102, flexing in two positions and acting as a suspension system for the tow hitch 100. The springs 108 can be adjusted to accommodate different loads, and additional springs 108 can be added to the hinges 102 to accommodate the different loads.

The springs 108 are secured to the tow hitch 100 via bolts 110 and washers which are secured via nuts 112. Preferably, the bolts 110 are 8" bolts, but any suitable bolts can be used without affecting the overall concept of the invention. Preferably, the bolts 110 includes nylock nuts 112, but any suitable nuts can be used without affecting the overall concept of the invention. A first spring 108 is threaded through each bolt 110, and the bolts 110 are inserted through the hinges 102, then another spring 108 is inserted at the end of the bolt 110 and the bolt 110 is secured with a nut 112.

Figure 2:
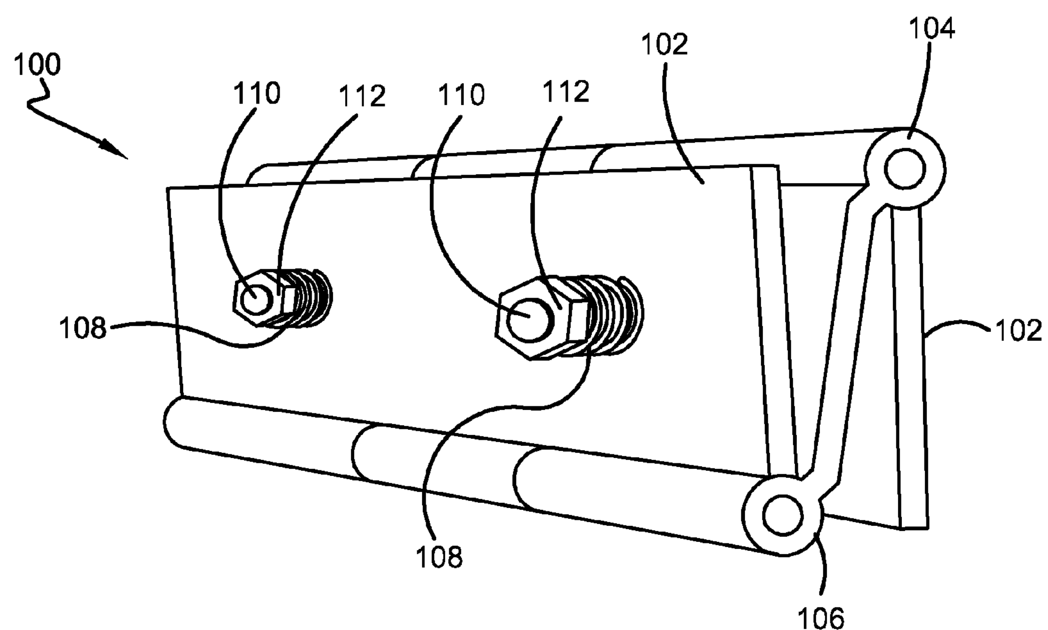
FIG. 2 illustrates a perspective view of the double hinged tow hitch device wherein the hinges are flexed in two positions.

FIG. 2 illustrates the double hinged tow hitch device 100 wherein the hinges 102 are flexed in two positions. The two hinges 102 of the tow hitch device 100 are secured together by a pin 104 positioned at an upper portion of the hinges 102 and a pin 106 positioned at a lower portion of the hinges 102. The pins 104 and 106 secure the hinges 102 together and allow the hinges 102 to flex in two positions as shown in FIG. 2.

Additionally, the tow hitch device 100 comprises springs 108 positioned on either side of the hinges 102 that act as a suspension system for the tow hitch 100. When pressure is applied to the tow hitch 100, the springs 108 will collapse into either the upper or lower portions of the hinges 102, causing the hinges 102 to flex in two positions and acting as a suspension system for the tow hitch 100. The springs 108 can be adjusted and additional springs 108 can be added to accommodate different loads. Accordingly, when the tow hitch 100 is attached to the tow vehicle (not shown), the tow hitch 100 allows full traction to the ground and complete control of steering due to the suspension system created by the springs 108.

The springs 108 are secured to the tow hitch 100 via bolts 110 and washers which are secured via nuts 112. Preferably, the bolts 110 are 8" bolts, but any suitable bolts can be used without affecting the overall concept of the invention. Preferably, the bolts 110 includes nylock nuts 112, but any suitable nuts can be used without affecting the overall concept of the invention. A first spring 108 is threaded through each bolt 110, and the bolts 110 are inserted through the hinges 102, then another spring 108 is inserted at the end of the bolt 110 and the bolt 110 is secured with a nut 112.

Figure 3:
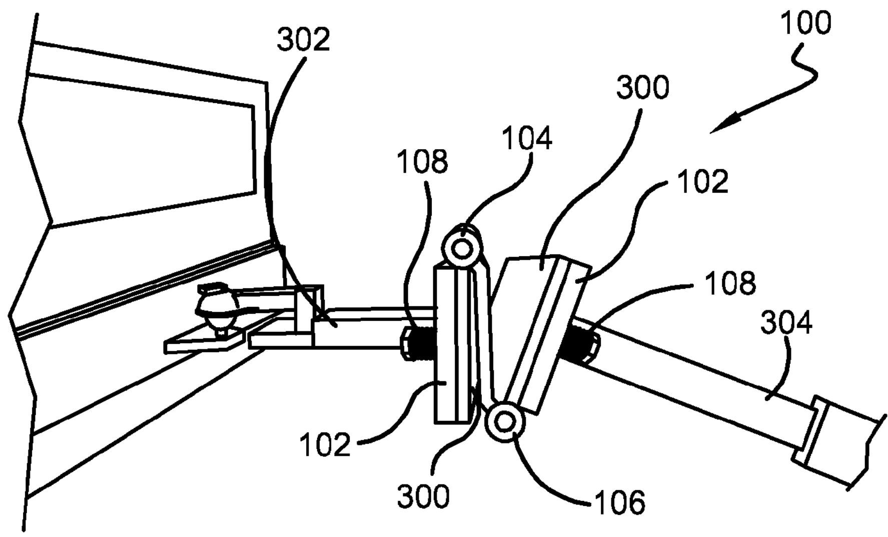
FIG. 3 illustrates a perspective view of the double hinged tow hitch device wherein rubber is positioned in between the hinges.

FIG. 3 illustrates the double hinged tow hitch device 100 wherein rubber 300 is positioned between the hinges 102. The two hinges 102 of the tow hitch device 100 are secured together by a pin 104 positioned at an upper portion of the hinges 102 and a pin 106 positioned at a lower portion of the hinges 102. The pins 104 and 106 secure the hinges 102 together and allow the hinges 102 to flex in two positions.

Furthermore, the tow hitch device 100 comprises springs 108 positioned on either side of the hinges 102 that act as a suspension system for the tow hitch 100. Rubber 300 is then positioned between the hinges 102 to keep the hinges 102 square and silent. Additionally, rubber 300 is positioned between the hinges 102 to act as a shock absorber. When pressure is applied to the tow hitch 100, the springs 108 will collapse into either the upper or lower portions of the hinges 102, causing the hinges 102 to flex in two positions and pressing against the rubber 300 between the hinges 102, thus acting as a suspension system for the tow hitch 100. The springs 108 can be adjusted and additional springs 108 can be added to accommodate different loads. Accordingly, when the tow hitch 100 is attached to the tow vehicle, the tow hitch 100 allows full traction to the ground and complete control of steering due to the suspension system created by the springs 108 and rubber 300.

Furthermore, the double hinged tow hitch device 100 comprises tubing 302 and 304 that is secured to both sides of the hinges 102 to allow the tow hitch 100 to be attached to a tow vehicle and a trailer. Preferably, the tubing is a square tube and is welded to the tow hitch device 100. The section of tubing 304 secured to the trailer will be 1 and ½" tubing and the section of tubing 302 secured to the tow vehicle will be 2" tubing, however any suitable tubing and size of tubing can be used without affecting the overall concept of the invention. The tow hitch device 100 would be secured to the tow vehicle via a ball receiver at the end of the tubing 302. And, the tow hitch device 100 will be bolted to the bottom of the trailer by a plate welded to the top of the square tubing 304.

Figure 4:
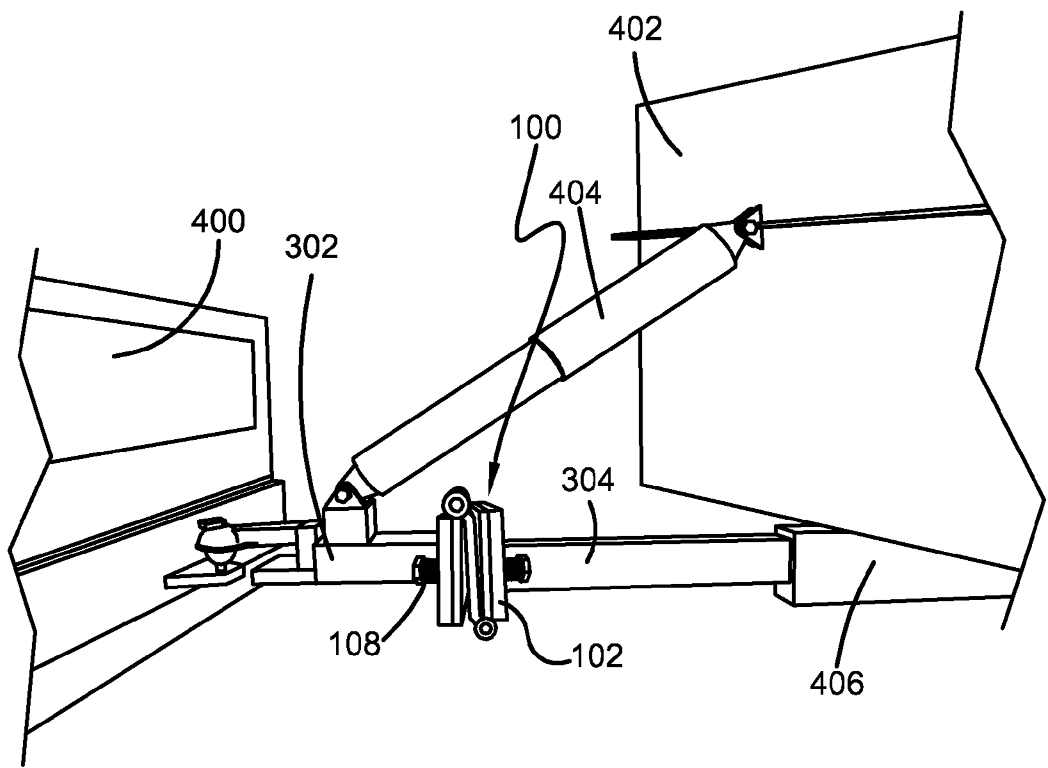
FIG. 4 illustrates a perspective view of the double hinged tow hitch device secured to the tow vehicle and the trailer.

FIG. 4 illustrates the double hinged tow hitch device 100 secured to a tow vehicle 400 and a trailer 402. The tow hitch 100 comprises bolts with nuts and flat washers that secure the springs 108 to the tow hitch 100. Preferably, the plurality of bolts includes nylock nuts, but any suitable nuts can be used without affecting the overall concept of the invention.

The springs 108 positioned on either side of the hinges 102 act as a suspension system for the tow hitch 100. When pressure is applied to the tow hitch 100, the springs 108 will collapse into either the upper or lower portions of the hinges 102, causing the hinges 102 to flex in two positions and acting as a suspension system for the tow hitch 100. The springs 108 can be adjusted and additional springs 108 can be added to accommodate different loads.

Furthermore, the double hinged tow hitch device 100 comprises tubing 302 and 304 that is secured to both sides of the hinges 102 to allow the tow hitch 100 to be attached to a tow vehicle 400 and a trailer 402. Preferably, the tubing is a square tube and is welded to the tow hitch device 100. The section of tubing 304 secured to the trailer 402 will be 1 and ½" tubing and the section of tubing 302 secured to the tow vehicle 400 will be 2" tubing, however any suitable tubing and size of tubing can be used without affecting the overall concept of the invention. The tow hitch device 100 would be secured to the tow vehicle 400 via a ball receiver at the end of the tubing 302. And, the tow hitch device 100 will be bolted to the bottom of the trailer 402 by a plate 406 welded to the top of the square tubing 304. Preferably, the plate 406 is a 3/16" plate, however any suitable size plate can be used without affecting the overall concept of the invention. The plate 406 secures the tow hitch device 100 along with additional tubing 304 to the axle of the trailer 402. Further, a piece of strapping (not shown) can be added to reinforce the mounting of the tow hitch device 100 to the trailer 402, but is not necessary.

Additionally, a shock absorber 404 can be secured to the tubing 302 behind the tow vehicle 400 and in front of the tow hitch device 100. The shock absorber 404 can be hooked or bolted to the tubing 302 to add to the suspension system created by the springs 108. Accordingly, when the tow hitch 100 is attached to the tow vehicle 400 and the trailer 402, the tow hitch 100 allows full traction to the ground and complete control of steering due to the suspension system created by the springs 108. Further, the tow hitch 100 can be easily unhooked from the tow vehicle 400, even when the tow vehicle 400 or trailer 402 is stuck in the mud, snow, etc.

Figure 5:
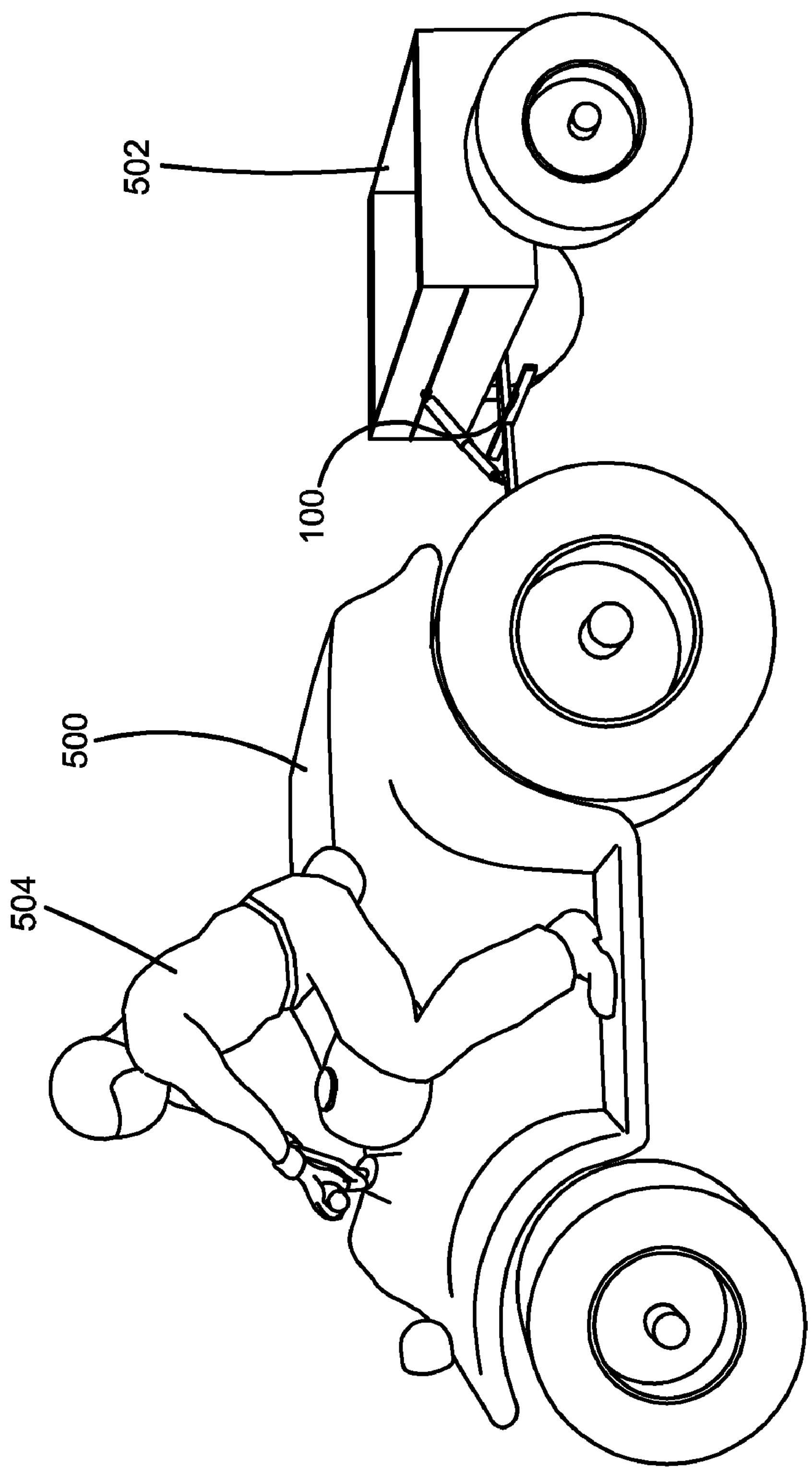
FIG. 5 illustrates a perspective view of the double hinged tow hitch device being used with an All-Terrain Vehicle (ATV).

FIG. 5 illustrates the double hinged tow hitch device 100 being used with an All-Terrain Vehicle (ATV) 500. A user 504 secures the tow hitch device 100 to the ATV 500 and trailer 502. The tow hitch device 100 would be secured to the ATV 500 via a ball receiver positioned at the end of the tubing that extends from the tow hitch device 100. And, the tow hitch device 100 will be bolted to the bottom of the trailer 502 by a plate welded to the top of the square tubing that extends from the tow hitch device 100. The tow hitch 100 allows full traction to the ground and complete control of steering due to the suspension system created. Further, the tow hitch 100 can be easily unhooked from the ATV 500, even when the ATV 500 or trailer 502 is stuck in the mud, snow, etc.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tow hitch device comprising:
at least two hinges;
two springs positioned on both sides of the at least two hinges;
a pin secured at an upper portion of the at least two hinges and a pin secured at a lower portion of the at least two hinges; and
tubing secured to both sides of the at least two hinges.

2. The tow hitch device of claim 1, wherein the at least two hinges are positioned back-to-back.

3. The tow hitch device of claim 2, further comprising rubber positioned in between the at least two hinges.

4. The tow hitch device of claim 3, wherein the springs will collapse into either the upper or lower portion when pressure is applied to the at least two hinges, acting as a suspension.

5. The tow hitch device of claim 1, wherein the springs are adjusted to accommodate different loads.

6. The tow hitch device of claim 5, wherein additional springs are added to accommodate different loads.

7. The tow hitch device of claim 5, wherein the springs are secured to the at least two hinges by bolts with nylock nuts and flat washers.

8. A double hinged tow hitch assembly comprising:
two hinges positioned back-to-back;
two springs positioned on both sides of the two hinges;
a pin secured at an upper portion of the two hinges and a pin secured at a lower portion of the two hinges; and
tubing secured to both sides of the two hinges.

9. The double hinged tow hitch assembly of claim 8, wherein the tubing is a square tube and is welded to the two hinges.

10. The double hinged tow hitch assembly of claim 9, further comprising a ball receiver secured to an end of the tubing for attachment to a tow vehicle.

11. The double hinged tow hitch assembly of claim 10, further comprising a plate welded to an end of the tubing for attachment to a trailer.

12. The double hinged tow hitch assembly of claim 8, further comprising a shock absorber secured to the tubing.

13. The double hinged tow hitch assembly of claim 8, wherein the springs will collapse into either the upper or lower portion when pressure is applied to the two hinges, acting as a suspension.

14. The double hinged tow hitch assembly of claim 13, wherein the springs are adjusted to accommodate different loads.

15. A tow hitch device for use as an independent suspension system comprising:
two hinges positioned back-to-back;
rubber positioned in between the two hinges; and
two springs positioned on both side of the two hinges,
wherein the two springs will collapse into either an upper or a lower portion when pressure is applied to the two hinges, acting as an independent suspension system.

16. The tow hitch device of claim 15, further comprising a pin secured at the upper portion of the two hinges and a pin secured at the lower portion of the two hinges.

17. The tow hitch device of claim 15, further comprising tubing secured to both sides of the two hinges.

18. The tow hitch device of claim 17, further comprising a shock absorber secured to the tubing.

19. The tow hitch device of claim 15, wherein the springs are adjusted to accommodate different loads.

20. The tow hitch device of claim 19, wherein additional springs are added on either side of the two hinges to accommodate different loads.

* * * * *